US011010838B2

(12) United States Patent
Xu

(10) Patent No.: US 11,010,838 B2
(45) Date of Patent: May 18, 2021

(54) SYSTEM AND METHOD FOR OPTIMIZING DAMAGE DETECTION RESULTS

(71) Applicant: Alibaba Group Holding Limited, George Town (KY)

(72) Inventor: Juan Xu, Beijing (CN)

(73) Assignee: Advanced New Technologies Co., Ltd., George Town (KY)

(*) Notice: Subject to any disclaimer, the term of this patent is extended or adjusted under 35 U.S.C. 154(b) by 99 days.

(21) Appl. No.: 16/550,991

(22) Filed: Aug. 26, 2019

(65) Prior Publication Data

US 2020/0074560 A1 Mar. 5, 2020

(30) Foreign Application Priority Data

Aug. 31, 2018 (CN) .......................... 201811015506.4

(51) Int. Cl.
*G06K 9/00* (2006.01)
*H04N 7/18* (2006.01)
(Continued)

(52) U.S. Cl.
CPC ............. *G06Q 40/08* (2013.01); *G06F 16/56* (2019.01); *G06K 9/46* (2013.01); *G06K 9/6215* (2013.01);
(Continued)

(58) Field of Classification Search
USPC ....... 382/190, 100, 103–108, 154, 156, 162, 382/172, 173, 181, 116, 209, 219, 224,
(Continued)

(56) References Cited

U.S. PATENT DOCUMENTS 8,180,629 B2 * 5/2012 Rehberg ................. G06F 40/30
704/9
9,607,138 B1 3/2017 Baldwin
(Continued)

FOREIGN PATENT DOCUMENTS

WO 2017059576 4/2017
WO 2018055340 3/2018

OTHER PUBLICATIONS

Zhou Huabing et al.: "Image Classification Based on Region of Interest Detection", Visual Communications and Image Processing; Jan. 20, 2004; San Jose; vol. 9813, Dec. 14, 2015, pp. 98130U-98130U, XP060063208, paragraph [0001]; figure 1.
(Continued)

*Primary Examiner* — Seyed H Azarian
(74) *Attorney, Agent, or Firm* — Shun Yao; Park, Vaughan, Fleming & Dowler LLP

(57) ABSTRACT

One embodiment can provide a system for detecting optimizing a damage detection result. During operation, the system can obtain a digital image of a damaged vehicle, identify a set of candidate damaged areas from the digital image as the damage detection result. The system can then extract a set of feature vectors corresponding to the set of candidate damaged areas For each candidate damaged area, the system can calculate a set of similarity features between the candidate damaged area and other candidate damaged areas in the set of candidate damaged areas based on the set of feature vectors. The system can input the set of similarity features to a damage prediction module. The system can then determine whether the candidate damaged area is an exceptional area based on an output of the damage prediction module to optimize the damage detection result.

13 Claims, 8 Drawing Sheets

(51) Int. Cl.

| | |
|---|---|
| *G06Q 40/08* | (2012.01) |
| *G06F 16/56* | (2019.01) |
| *G06N 20/00* | (2019.01) |
| *G06N 5/04* | (2006.01) |
| *G06K 9/62* | (2006.01) |
| *G06K 9/46* | (2006.01) |
| *G06T 7/00* | (2017.01) |

(52) U.S. Cl.
CPC ............... *G06N 5/04* (2013.01); *G06N 20/00* (2019.01); *G06T 7/0002* (2013.01); *G06T 2207/20076* (2013.01); *G06T 2207/20081* (2013.01); *G06T 2207/30252* (2013.01)

(58) Field of Classification Search
USPC ...... 382/254, 276, 305, 312; 704/9; 348/148
See application file for complete search history.

(56) References Cited

U.S. PATENT DOCUMENTS

| | | |
|---|---|---|
| 2001/0046659 A1 | 11/2001 | Oster |
| 2009/0206993 A1 | 8/2009 | Di Mambro |
| 2013/0015946 A1 | 1/2013 | Lau |
| 2013/0208103 A1 | 8/2013 | Sands |
| 2014/0037184 A1 | 2/2014 | Gorski |
| 2014/0270411 A1 | 9/2014 | Shu |
| 2015/0110364 A1* | 4/2015 | Niinuma ............ G06K 9/00255 382/116 |
| 2015/0110366 A1 | 4/2015 | Sezille |
| 2015/0341370 A1 | 11/2015 | Khan |
| 2016/0034786 A1 | 2/2016 | Suri |
| 2016/0063235 A1 | 3/2016 | Tussy |
| 2016/0283787 A1 | 9/2016 | Nepomniachtchi |
| 2016/0307029 A1 | 10/2016 | Vaknin |
| 2017/0048244 A1* | 2/2017 | Loughlin-McHugh ..................... G06K 9/0061 |
| 2017/0060867 A1 | 3/2017 | Moutinho |
| 2017/0061563 A1 | 3/2017 | Falkenstern |
| 2018/0083973 A1 | 3/2018 | Paraskevas |
| 2018/0260793 A1* | 9/2018 | Li ........................ G06T 7/001 |
| 2020/0175352 A1* | 6/2020 | Cha ...................... G06N 3/0454 |

OTHER PUBLICATIONS

Hyungtae Lee et al.: "Fast Object Localization Using a CNN Feature Map Based Multi-Scale Search", arxiv.org, Cornell University Library, 201 Olin Library Cornell University Ithaca, NY 14853, Apr. 12, 2016, XP080695042, Section 3.2, Figure 3.

* cited by examiner

SYSTEM AND METHOD FOR OPTIMIZING DAMAGE DETECTION RESULTS

RELATED APPLICATION

Under 35 U.S.C. 119, this application claims the benefit and right of priority of Chinese Patent Application No. 201811015506.4, filed Aug. 31, 2018.

BACKGROUND

Field

This disclosure is generally related to the technical fields of artificial intelligence and machine learning. More specifically, this disclosure is related to a system and method for optimizing a damage detection result in intelligent vehicle insurance damage assessment.

Related Art

In conventional vehicle insurance damage assessment approaches, a vehicle insurance company can send a professional claim adjuster to the site of the damaged vehicle to conduct a manual survey and damage assessment. The survey and damage assessment conducted by the adjuster can include the following tasks: determining a repair solution, estimating an indemnity, taking photographs of the vehicle on the site and archiving the photographs for subsequent assessment of the damage by a damage inspection person at the vehicle insurance company. Since the on-site survey and subsequent damage assessment are performed manually, an indemnity claiming cycle can be as long as 1-3 days. Such long processing times can result in poor user experience with the vehicle insurance company. Furthermore, since the survey and damage assessments are performed manually, the insurance company may incur large labor cost and professional knowledge training costs.

Due to the above-mentioned drawbacks of using manual survey and damage assessments, vehicle insurance companies have started to apply image-based artificial intelligence and machine learning to vehicle damage assessment approaches that may shorten the wait time and reduce labor costs. These approaches enable automatic identification of damaged parts and damage degrees from on-site pictures of the vehicle taken by users. In addition, the on-site pictures of the vehicle can be used by computer-vision image identification technology with artificial intelligence to provide a repair solution. Therefore, by automating the survey and damage assessment approaches, the labor costs incurred by a vehicle insurance company can be reduced and vehicle insurance claiming experience of a user can be improved.

However, some challenges still remain in providing accurate damage identification while using the automated survey and damage assessment approaches for assessing vehicle damage.

SUMMARY

According to one embodiment of the present invention, a system for optimizing the damage detection result is provided. During operation, the system can obtain a digital image of a damaged vehicle, identify a set of candidate damaged areas from the digital image as the damage detection result. The system can then extract a set of feature vectors corresponding to the set of candidate damaged areas. For each candidate damaged area, the system can calculate a set of similarity features between the candidate damaged area and other candidate damaged areas in the set of candidate damaged areas based on the set of feature vectors. The system can input the set of similarity features to a damage prediction module. The system can then determine whether the candidate damaged area is an exceptional area based on an output of the prediction module to optimize the damage detection result.

In a variation on this embodiment, the system identifies the set of candidate damaged areas by applying a damage identification model.

In a further variation on this embodiment, applying the damage identification model can include: identifying a plurality of damage objects in the digital image; identifying a damage category for each damage object; and marking each damage object in the plurality of damage objects by a bounding box, wherein the bounding box comprises the damage object, and wherein the damage object represents a candidate damaged area.

In a variation on this embodiment, extracting the set of feature vectors corresponding to the set of candidate damaged areas can include: applying a convolution processing technique to the digital image to obtain a feature map of the digital image; and extracting, by using the feature map, the set of feature vectors corresponding to the set of candidate damaged areas.

In a variation on this embodiment, the target object is a vehicle.

In a further variation on this embodiment, the system can train the damage prediction module based on a training sample set, wherein the training sample set includes a set of positive samples and a set of negative samples. The set of positive samples includes a plurality of real damaged areas, and the set of negative samples includes a plurality of real damaged areas and at least one non-real damaged area. The damage prediction model can be included in the damage prediction module.

In a further variation on this embodiment, the system outputs a probability associated with the candidate damaged area; and determines that the candidate damaged area is the exceptional area based on the probability and a pre-determined threshold.

In a further variation on this embodiment, in response to detecting the candidate damaged area as an exceptional area, identifying the candidate damaged area as a non-real damaged area; and excluding the candidate damaged area from the damage detection result.

BRIEF DESCRIPTION OF THE FIGURES

In the figures, like reference numerals refer to the same figure elements.

DETAILED DESCRIPTION

Figure 1:
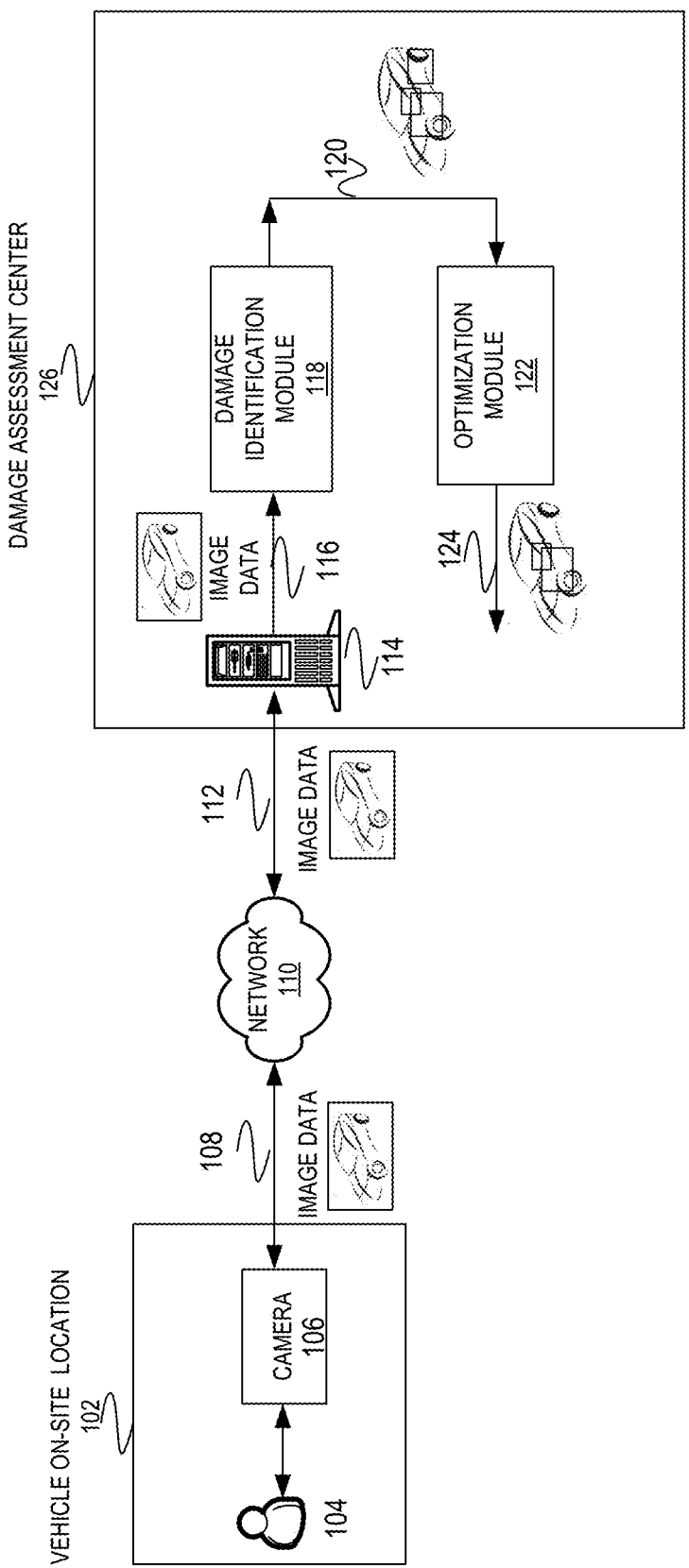
FIG. 1 illustrates an exemplary environment and communication for facilitating optimization of damage detection results, according to one embodiment of the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

One way to identify damage conditions (e.g., damaged parts and degrees of damage) from images of a damaged vehicle is comparing the captured image of the damaged vehicle with a plurality of similar images of different vehicles previously stored in a database. However, in this method, the damage detection result is not always accurate.

An additional challenge encountered by conventional damage identification models that are trained by using a tagged training sample set is the presence of reflections and dirt interferences on the surface of the vehicle. Specifically, while real damages in the digital image of a vehicle may be correctly detected, reflections and/or dirt may be falsely detected as damages, thereby resulting in the occurrence of false positives in the damage detection result.

To reduce false positives in the damage detection result, one embodiment of the present invention can perform an analysis of plurality of images to identify typical characteristic features associated with damages on a vehicle surface. For example, a single collision or scratch accident may cause multiple damages on vehicle body surface. Such damages may generally have similar visual features, specifically: height of the damages may be similar, the scratch traces may tend to be contiguous, and/or colors attached to the surface of the vehicle body due to the scratch may be the same. One of the embodiments described herein uses these characteristic features to improve damage detection results.

According to one embodiment of the present invention, a system for optimizing the damage detection result is provided. During operation, the system can obtain a digital image of a damaged vehicle, identify a set of candidate damaged areas from the digital image as the damage detection result. The system can then extract a set of feature vectors corresponding to the set of candidate damaged areas For each candidate damaged area the system can calculate a set of similarity features between the candidate damaged area and other candidate damaged areas in the set of candidate damaged areas based on the set of feature vectors. The system can input the set of similarity features to a damage prediction module. The system can then determine whether the candidate damaged area is an exceptional area based on an output of the prediction module to optimize the damage detection result.

Exemplary Environment and Communication

FIG. 1 illustrates an exemplary environment and communication for facilitating optimization of damage detection results, according to one embodiment of the present invention. In some embodiments, an exemplary environment 100 can include a vehicle on-site location 102 and a damage assessment center 126. At vehicle on-site location 102, a user 104 can use a picture capturing device 106 to capture pictures of a damaged vehicle. User 104 can upload the captured picture(s) to a server 114 at damage assessment center 126. The system can send the digital image data 108 (captured pictures) to damage assessment center 126 via a communication network 110. At damage assessment center 126, image data 112 can be stored in server 114 for analysis and damage assessment.

Damage assessment center 126 further includes a damage identification module 118 and an optimization module 122. Damage identification module 118 retrieves image data 116 from server 114 for performing damage identification. If the vehicle in the picture contains contiguous damaged areas, for example, scratches, marks, and similar kind of damages, damage identification module 118 may identify a plurality of damaged areas from image data 116 as a damage detection result 120.

Damage identification module 118 may correctly identify real damages. However, due to the characteristics of the damage on the surface of the vehicle, some reflections and/or dirt interferences may be falsely detected as damages. Due to the presence of such false positives in damage detection result 120, damage identification module 118 sends damage detection result 120 to optimization module 122 for further processing. Optimization module 122 can use the concept of attention mechanism to determine whether a damaged area in damage detection result 120 is a real damaged area.

The attention mechanism is a concept that is used in natural language processing. In natural language processing, where a word or a sentence needs to be interpreted or understood, contextual information may help to understand the correct meaning of a word or a sentence. However, there exist some challenges in natural language processing Specifically, the contextual information present at different locations may exert different impacts on the word or the sentence. The intensity of each impact is not known because such contextual information may be present before or after the word or the sentence. In addition the distance of the contextual information from the word or the sentence is also not defined. The attention mechanism is capable of overcoming these challenges.

The attention mechanism may also be applied to the field of image processing. For example, a region in a picture that is critical to identifying a specific object may need more "attentions." Therefore, in embodiments of the present invention, optimization module 122 can use the attention mechanism to calculate a set of similarity correlations between a selected damaged area and other damaged areas in damage detection result 120. When the attention mechanism in optimization module 124 detects some damaged areas in damage detection result 120 as false positives, optimization module 124 may mark these damaged areas as exceptional areas (i.e., outliers) and may exclude them from damage detection result 120, thereby optimizing damage detection result 120 to obtain an optimized damage detection result 124.

System Architecture and Operation

Figure 2:
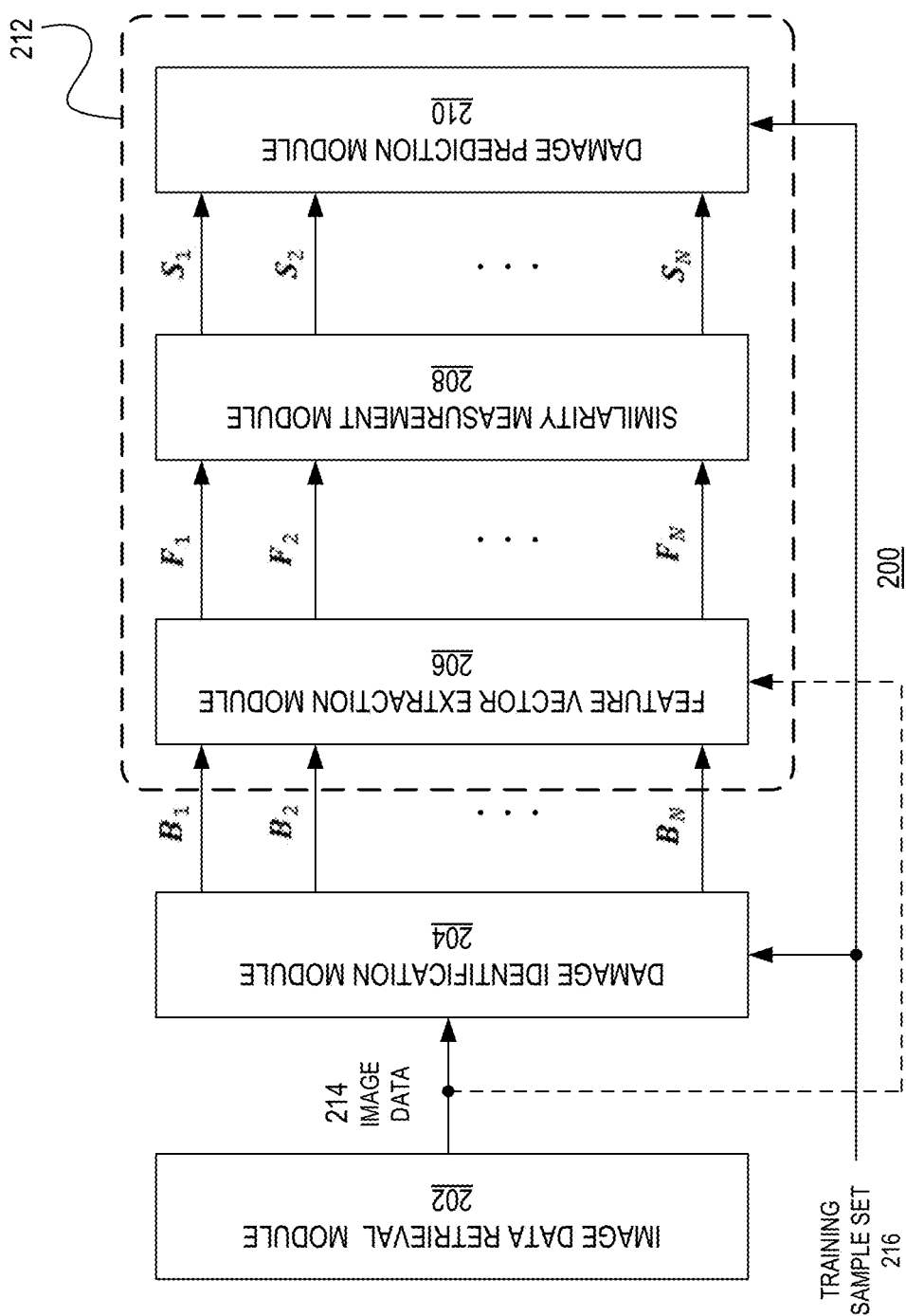
FIG. 2 shows an exemplary damage detection result optimization architecture, according to one embodiment of the present invention.

FIG. 2 shows an exemplary damage detection result optimization architecture, according to one embodiment of the present invention. A damage detection result optimization system 200 can represent a system at damage assessment center 126 (shown in FIG. 1). Damage detection result optimization system 200 can include an image data retrieval module 202, a damage identification module 204, and an optimization module 212. Optimization module 212 can further include a feature vector extraction module 206, a similarity measurement module 208, and a damage prediction module 210. Image data retrieval module 202 can retrieve vehicle pictures stored in server 114 at damage assessment center 126 (shown in FIG. 1). Image data or digital image 214 can include at least one vehicle damage picture photographed by a user at a vehicle damage site.

Figure 3:
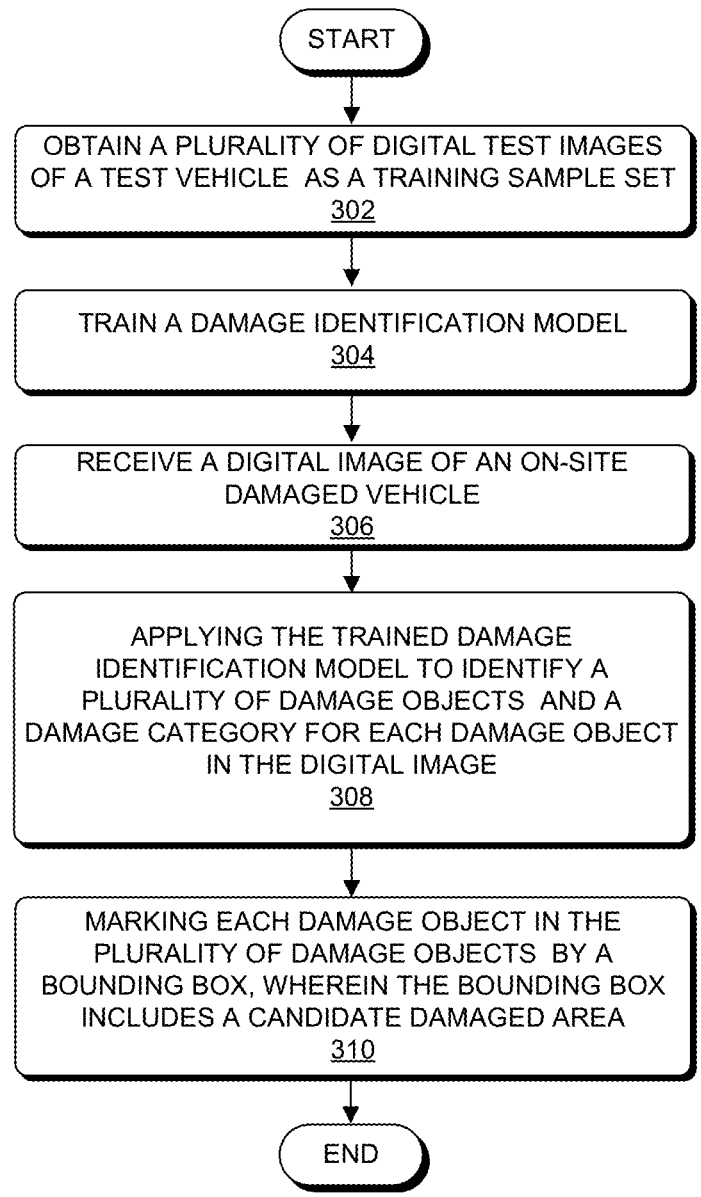
FIG. 3 presents a flowchart illustrating an exemplary process for performing damage identification, in accordance with an embodiment of the present invention.

Damage identification module 204 can be responsible for identifying a plurality of candidate damaged areas from the vehicle damage picture. FIG. 3 presents a flowchart illustrating an exemplary process for performing damage identification by damage identification module 204, in accordance with an embodiment of the present invention. During operation, damage identification module 204 may obtain a plurality of digital test images of different test vehicles as a training sample set (operation 302). Damage identification module 204 may then train a damage identification model to identify damage objects from the training sample set, which can include a large number of vehicle damage pictures with tags (operation 304). The training sample set may include a set of positive samples and a set of negative samples. The set of positive samples can include a plurality of damaged areas in the vehicle pictures that are tagged as real damaged areas, and the set of negative samples can include a plurality of damaged areas in the vehicle pictures that are tagged as real damages areas and at least one area is tagged as a non-real damaged area.

Subsequent to training the damage identification model, damage identification module 204 can receive a vehicle damage picture (digital image of the vehicle on-site) for damage identification (operation 306). Optionally, damage identification module 204 can employ a target detection algorithm in the damage identification model. The target detection algorithm can be used to identify a plurality of damage objects (or a plurality of candidate damaged areas) and a damage category for each damage object from the digital image or the vehicle damage picture (operation 308). In addition, the target detection algorithm can emphasize the identified damage objects by marking each damage object in the vehicle damage picture by a rectangular bounding box. This rectangular bounding box can include the damage object (or a candidate damage area) and a category of the damage object (operation 310).

Returning to FIG. 2, when the vehicle in the picture contains contiguous damaged areas, e.g., scratches, marks, and the like, damage identification module 204 may use the damage identification model and the target detection algorithm to identify a plurality of candidate damaged areas denoted as B={$B_1, B_2, \ldots, B_N$} from the vehicle damage pictures, where N denotes number of candidate damaged areas. Each of these candidate damaged areas is marked by a bounding box.

The plurality of candidate damaged areas identified by damage identification module 204 may also include non-real damage areas. This is because reflections and dirt on the surface of the vehicle body may also be incorrectly identified as a candidate damaged area. Therefore, damage identification module 204 may send the damage detection result B to optimization module 212 to analyze and optimize the damage detection result B.

Optimization module 212 processes the damage detection result B by using: feature vector extraction module 206, similarity measurement module 208, and damage prediction module 210. An objective of optimization module 212 is to identify and exclude any non-real damage areas from the damage detection result B.

Feature vector extraction module 206 can be responsible for extracting a set of feature vectors F={$F_1, F_2, \ldots, F_N$}, from N candidate damaged areas B={$B_1, B_2, \ldots, B_N$}. More specifically, feature vector extraction module 206 can extract the $i^{th}$ feature vector $F_i$ from the $i^{th}$ candidate damaged area $B_i$.

In one embodiment of the present invention, feature vector extraction module 206 may optionally obtain pixel features corresponding to all the N candidate damaged areas from an original vehicle damage picture or image data 214. For example, an RGB pixel value and the feature vectors F for all the N candidate damaged areas can be extracted based on the pixel features in the original vehicle damage picture 214.

Feature vector extraction module 206 may obtain the feature vectors F by applying a convolution processing technique to the image data 214 (the original vehicle damage picture). Specifically, feature vector extraction module 206 may first obtain a feature map of the vehicle damage picture by applying a convolution processing technique, and then the feature vectors F for the N candidate damaged areas may be extracted from the feature map.

In the following section, the convolution processing technique is described in further detail. Feature vector extraction module 206 can use a convolution neural network (CNN) to perform the convolution processing technique. CNN is commonly used in the field of image processing to perform image recognition, image classifications, object detections, face recognition, etc. CNN can include a series of convolution layers with associated convolution kernels to perform a series of operations on an original input image. CNN can view the original input image as an array of pixels (or a pixel matrix) and a size of the array depends on an image resolution of the original input image. Each convolution kernel (or operator) is a matrix used for performing an operation on the original input image. The convolution kernel is generally a square grid structure, e.g., a 3×3 matrix or pixel region, with each grid containing a weight value.

When a convolution calculation is performed for the original input image by using the convolution kernel, the convolution kernel is slid upward on the pixel matrix. For each upward movement of the convolution kernel, a product between each element in the convolution kernel and an image pixel value covered by the convolution kernel is calculated. Then, a sum of the products is calculated, such that a new feature value matrix is obtained, which constitutes the feature map. The convolution operation may extract abstract features from the pixel matrix of the original input image. Based on a design of the convolution kernel, these abstract features may, for example, reflect line shapes, color distributions or other more global features in a region in the original input image.

Feature vector extraction module 206 may use the above-described convolution processing technique to obtain a feature map. For example, feature vector extraction module 206 may obtain the feature map for image data 214 (original vehicle damage picture) by inputting the image data 214 including the N candidate damage areas to the CNN to perform the convolution processing technique. Furthermore, since the CNN comprises a plurality of convolution layers to perform multiple convolution operations on the input image data 214, feature vector extraction module 206 may obtain the feature map from a convolution layer with a specific depth.

Subsequent to obtaining the feature map for the input image data 214, feature vector extraction module 206 may determine regions in the feature map that correspond to all the N candidate damage areas. These regions can be referred to as a feature sub-map. Based on features contained in the feature sub-map, feature vector extraction module 206 may extract the feature vectors $F=\{F_1, F_2, \ldots, F_N\}$ corresponding to all the N candidate damage areas $B=\{B_1, B_2, \ldots, B_N\}$ in the original vehicle damage picture or image data 214.

Similarity measurement module 208 can be responsible for calculating similarity features $S=\{S_1, S_2, \ldots, S_N\}$ between all the N candidate damage areas based on the feature vectors $\{F_1, F_2, \ldots, F_N\}$. Similarity measurement module 208 may calculate a similarity feature $A_{ij}$ between feature vectors $F_i$ and $F_j$ associated with corresponding candidate damaged areas $B_i$ and $B_j$, where $S_i=(A_{ij})_{j=1,2,\ldots,N}$, and N represents a total number of candidate damaged areas.

In one embodiment, similarity measurement module 208 may calculate a difference between feature vectors $F_i$ and $F_j$ corresponding to two candidate damaged areas $B_i$ and $B_j$, and a similarity feature $A_{ij}$ can be determined based on the difference. In another embodiment, similarity measurement module 208 may calculate a dot product between feature vectors $F_i$ and $F_j$, and a similarity feature $A_{ij}$ can be determined based a result of the dot product. For example, let $F_i=\{f_{i1}, f_{i2}, \ldots, f_{im}\}$ represent $i^{th}$ feature vector for an $i^{th}$ candidate damaged area $B_i$ and m denote a total number of feature values in the $i^{th}$ feature vector. Similarly, let $F_j=\{f_{j1}, f_{j2}, \ldots, f_{jm}\}$ represent $j^{th}$ feature vector for a $j^{th}$ candidate damaged area $B_j$. The similarity measure may be defined as:

$$A_{ij}=\{f_{i1}*f_{j1}, f_{i2}*f_{j2}, \ldots, f_{im}*f_{jm}\} \quad (1)$$

By using equation (1), similarity features between any two candidate damaged areas may be calculated based on their corresponding feature vectors.

Similarity features S calculated for all the candidate damaged areas can be used by damage prediction module 210 to determine whether each of the candidate damaged areas correspond to real damaged areas. Specifically, to determine whether a candidate damaged area k is a real damaged area, similarity measurement module 208 may calculate similarities between the candidate damaged area k and all other candidate damaged areas as:

$$S_k=(A_{k,1}, A_{k,2}, \ldots, A_{k,N}) \quad (2)$$

Similarity measurement module 208 may send similarity features S to damage prediction module 210. Damage prediction module 210 can be responsible for generating an output associated with a $k^{th}$ candidate damaged area based on corresponding similarity features $S_k$. Damage prediction module 210 can use a linear regression model, and the output of the damage prediction module 210 may be calculated by performing a linear operation on the similarity features $S_k$. For example, when the similarity features $S_k$ associated with the $k^{th}$ candidate damaged area is input to the linear regression model, the linear regression model may output a probability $P_k$ that the $k^{th}$ candidate damaged area is an exceptional area. The probability $P_k$ is given by:

$$P_k=f(w_1*A_{k,1}+w_2*A_{k,2}, \ldots, w_N*A_{k,N}) \quad (3)$$

where $\{w_1, w_2, \ldots, w_N\}$ represent weight factors.

Damage prediction module 210 may use a complex non-linear model as a prediction model, and may employ a non-linear transform to output a prediction result. Damage prediction module 210 may enable a person who establishes the prediction model to manually set parameters in the prediction model.

Damage prediction module 210 may determine parameters in the prediction model based on model training with a training sample set 216. For example, the prediction model may comprise a neural network structure, and the neural network structure can be trained by using training sample set 216 to determine parameters in various layers in the neural network structure. Damage prediction module 210 may configure an input layer in the neural network structure to receive similarity features $(A_{k,1}, A_{k,2}, \ldots, A_{k,N})$, and may transfer these similarity features to a next layer of neurons in the neural network structure by using a weight-carried connection. Damage prediction module 210 can then calculate a prediction result by using output values available at a layer in the neural network structure, e.g., output layer. Damage prediction module 210 may also use a complex neural network structure which can comprise multiple hidden layers.

Figure 4:
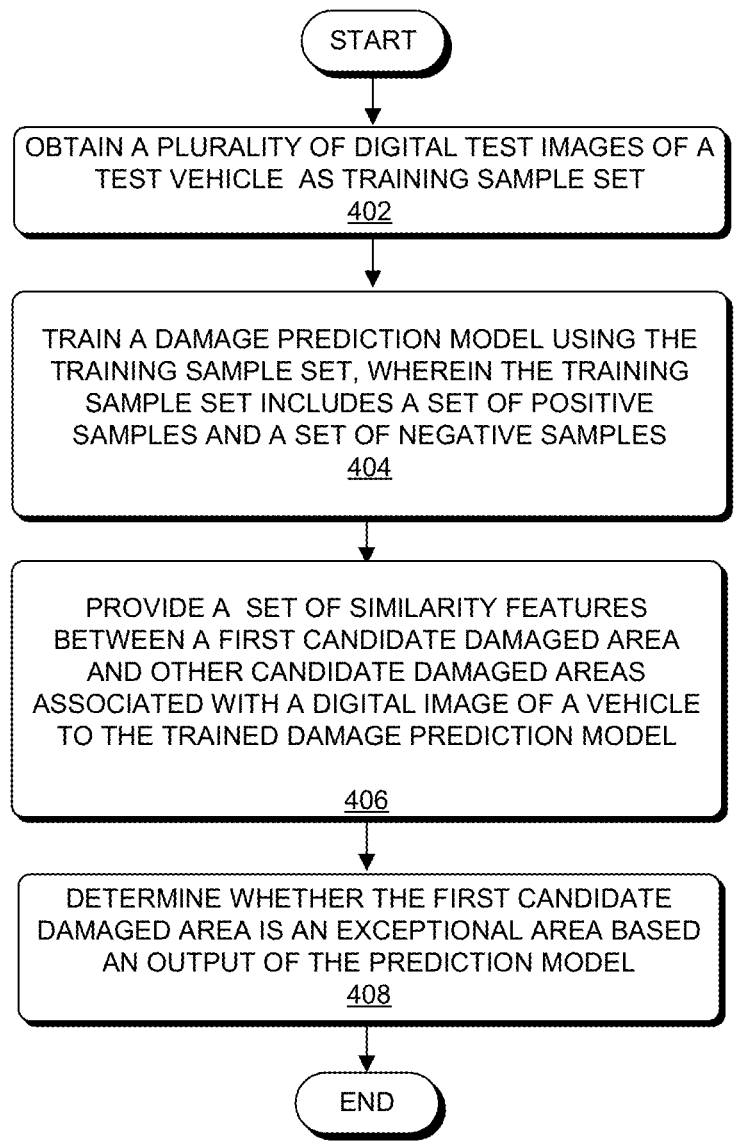
FIG. 4 presents a flowchart illustrating an exemplary process for performing damage prediction by using a damage prediction model, in accordance with an embodiment of the present invention.

In the following section, working of the damage prediction module 210 is described in further detail. FIG. 4 presents a flowchart illustrating an exemplary process for performing damage prediction using a damage prediction model, in accordance with an embodiment of the present invention. In one embodiment, damage prediction module 210 (shown in FIG. 2) may first train the prediction model before analyzing the similarity features $(A_{k,1}, A_{k,2}, \ldots, A_{k,N})$. Damage prediction module 210 may obtain a large number of pictures with tags as training sample set 216 (operation 402) to train the damage prediction model (operation 404). In one embodiment, training sample set 216 was used by damage identification module 204 to train the damage identification model, the same training sample set is optionally used by the damage prediction module 210 (shown in FIG. 2). Training sample set 216 may include a set of positive samples and a set of negative samples. The set of positive samples comprise a plurality of damaged areas in the vehicle pictures that are tagged as real damaged areas, and the set of negative samples comprise a plurality of damaged areas in the vehicle pictures that are tagged as real damages areas and at least one area is tagged as a non-real damaged area. Damage prediction module 210 may use such training sample set 216 to enable a prediction model to learn characteristics of similarity features between the real damaged areas from the positive samples, and to learn characteristics of similarity features between non-real damaged areas and real damaged areas from the negative samples.

Subsequent to training the damage prediction model, damage prediction module 210 may obtain as input at least a set of similarity features between a first candidate damaged area (e.g., a $k^{th}$ candidate damaged area) and other candidate damaged areas (operation 406). This input set of similarity features can be denoted as $(A_{k,1}, A_{k,2}, \ldots, A_{k,N})$ Based on the input set of similarity features damage prediction model may output a probability $P_k$ which indicates a probability with which the $k^{th}$ candidate damaged area is an exceptional area. Damage prediction module 210 may use the probability $P_k$ and a pre-determined threshold to determine whether the $k^{th}$ candidate damaged area is an exceptional area (operation 408).

Damage prediction module 210 may use a categorization model as the prediction model. The categorization model may directly output a result indicating whether the $k^{th}$ candidate damaged area is an exceptional area. In one embodiment, subsequent to damage prediction module 210 determining that the $k^{th}$ candidate damaged area is an exceptional area, the candidate damage area k may be sent to an artificial intelligence system for inspection. Subsequent to damage prediction module 210 determining that the $k^h$ candidate damaged area is an exceptional area, the candidate damage area k may be tagged as a special area, and may be excluded from the damage detection result, thereby optimizing the damage detection result.

Figure 5:
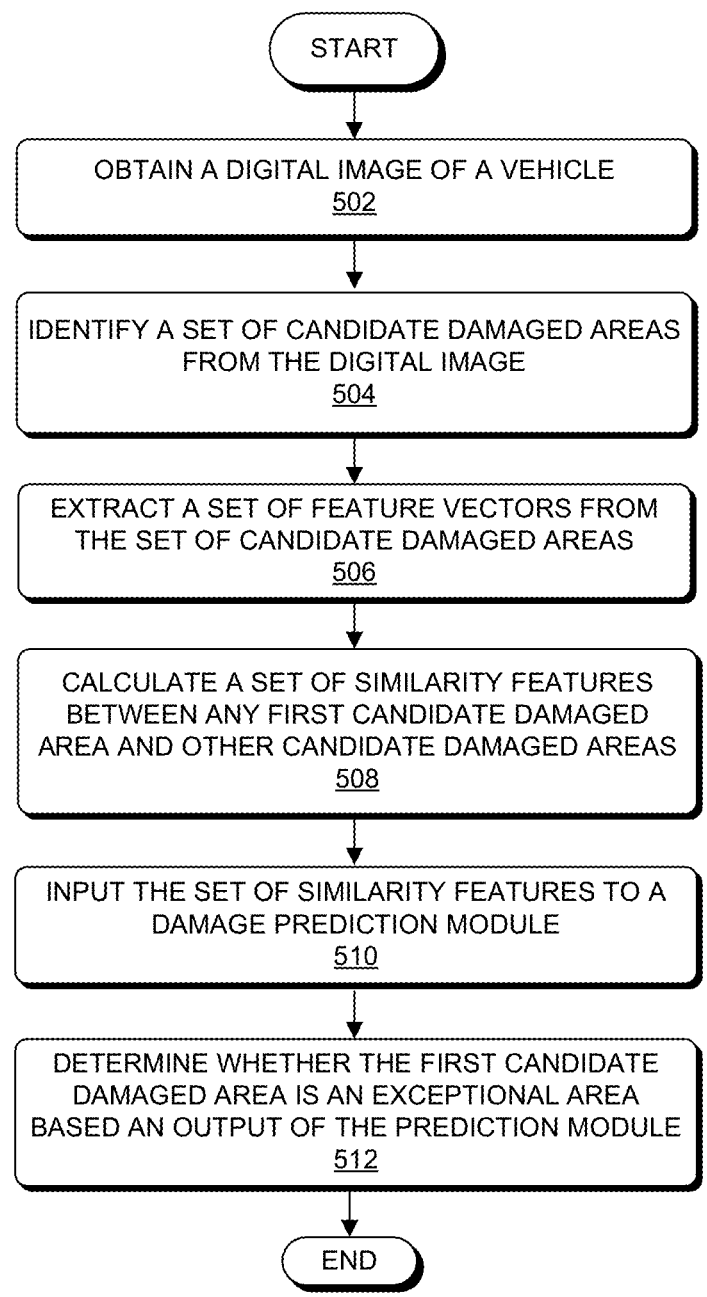
FIG. 5 presents a flowchart illustrating an exemplary process for performing optimization of damage detection results, according to one embodiment of the present invention.

FIG. 5 presents a flowchart illustrating an exemplary process for performing optimization of damage detection results, according to one embodiment of the present invention. During operation, the system may obtain at least one digital image of a damaged vehicle (operation 502). Based on the digital image the system may identify a plurality of candidate damaged areas by using a damage identification model that employs a target detection algorithm (operation 504). The system can pre-train the damage identification model by using a training sample set. The plurality of candidate damaged areas identified by the damage identification model represents a damage detection result. Since the damage detection result may include both real damaged areas and non-real damaged areas, the system may optimize the damage detection result by first extracting feature vectors corresponding to all the candidate damaged areas (operation 506). The system may first determine a feature map of the vehicle damage picture by using a convolution processing technique. Then the system can extract a set of feature vectors corresponding to all the candidate damaged areas from the feature map.

The system can use the set of feature vectors to calculate a plurality of similarity of features between any first candidate damaged area and the other candidate damaged areas in the plurality of candidate damaged areas (operation 508). In one embodiment, the system may obtain the plurality of similarity features by calculating a dot product between the feature vector of the first candidate damaged area and feature vectors of other candidate damaged areas, and determining a plurality of similarity features based on a plurality of dot product results.

The system can then input the plurality of similarity features to a damage prediction model (operation 510). The system may pre-train the damage prediction model by using the training sample set that was used by the damage identification model. The training sample set includes a set of positive samples and a set of negative samples. The set of positive samples comprise a set of candidate damaged areas that are tagged as real damaged areas, and the set of negative samples comprise a set of candidate damaged areas that are tagged as real damaged area and at least one area that is tagged as a non-real damaged area. The system can use the damage prediction model to output a probability associated with the first candidate damaged area. In one embodiment, the system can use the output of the damage prediction model to determine whether the first candidate damaged area is an exceptional area (operation 512). When the first candidate damaged area is determined as an exceptional areas then the system may exclude the exceptional area from the damage detection result, thereby optimizing and improving accuracy of the damage detection result.

Figure 6A:
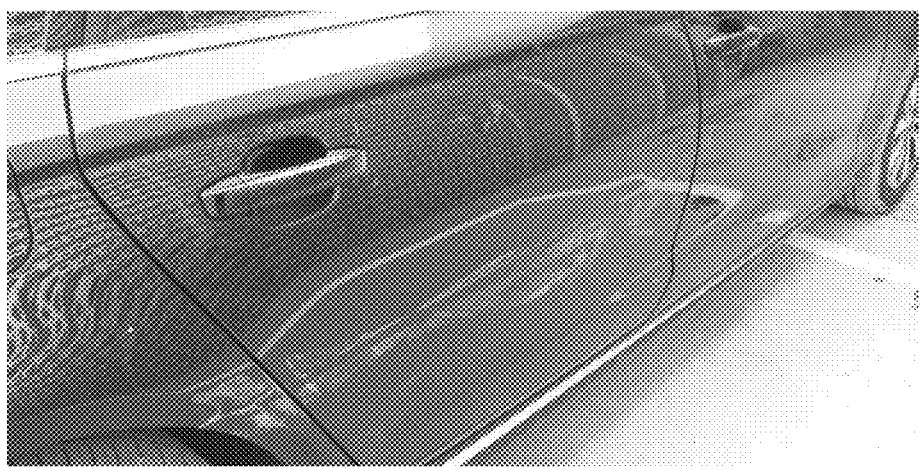
FIG. 6A shows a picture of a damaged vehicle, according to one embodiment of the present invention.
Figure 6B:
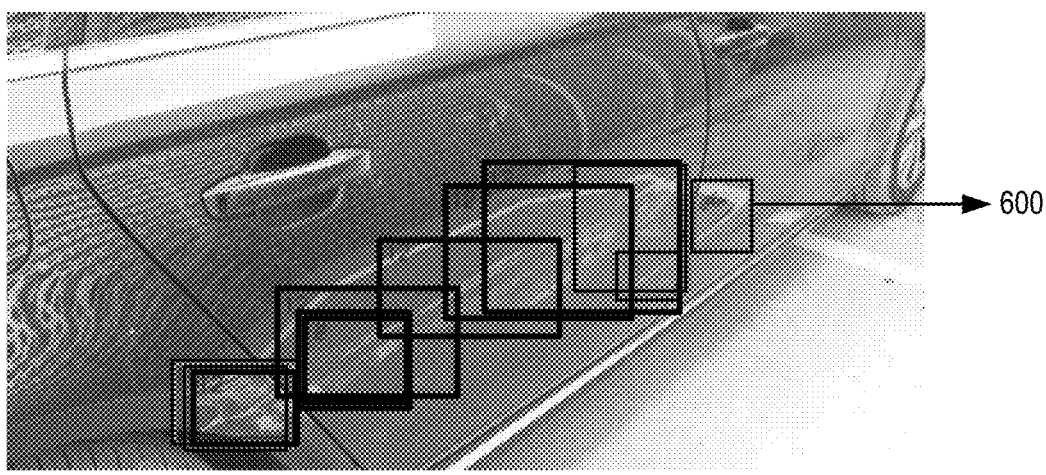
FIG. 6B shows an example of a damage detection result, according to one embodiment of the present invention.

FIG. 6A shows a picture of a damaged vehicle, according to one embodiment of the present invention. In FIG. 6A the vehicle in the picture contains contiguous scratches or contiguous damaged areas. FIG. 6B shows an exemplary example of damage detection results, according to one embodiment of the present invention. Damage identification module 204 (shown in FIG. 2) can use a digital image of the vehicle shown in FIG. 6A to identify the contiguous damaged areas, then a target detection algorithm can be employed to identify a plurality of candidate damaged areas/damage objects. These damage objects are marked by rectangular bounding boxes as shown in FIG. 6B. The number within each bounding box represents a category of the damage object. The vehicle parts or regions shown within the bounding boxes shown in FIG. 6B represent the plurality of candidate damaged areas.

Figure 6C:
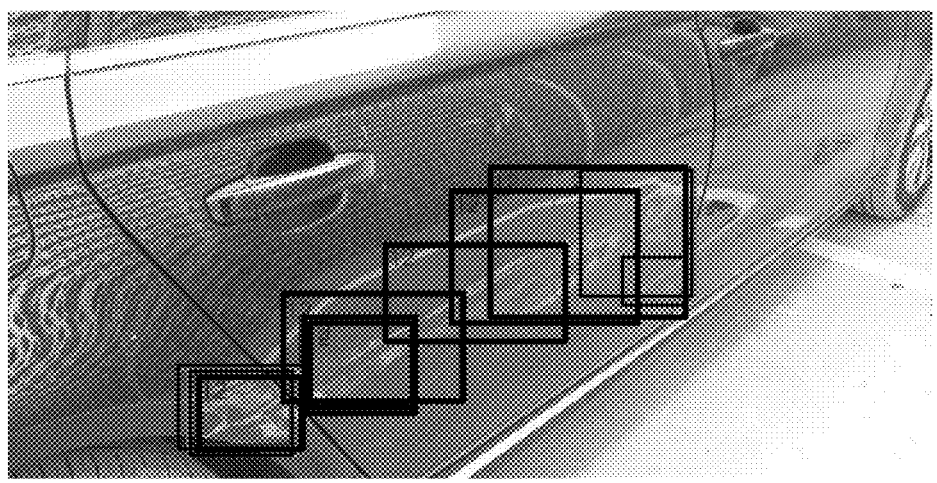
FIG. 6C shows an exemplary example of optimizing damage detection results, according to one embodiment of the present invention.

In FIG. 6B, the right-most candidate damaged area 600 marked within a bounding box is distinguishably different from the other identified candidate damaged areas in terms of color and shape of candidate damaged areas/damage objects. Right-most candidate damaged area 600 actually shows a reflection of an object on the ground and hence is not a real-damaged area. The other candidate damaged areas include all the contiguous scratches on the surface of the vehicle. Therefore, similarity measurement module 210 (shown in FIG. 2) may generate low similarities when it calculates similarity features between right-most candidate damaged area 600 and other candidate damaged areas. Based on these similarity features, damage prediction module 210 (shown in FIG. 2) may determine right-most candidate damaged area 600 as an exceptional area and may exclude the right-most candidate damaged area 600 from the damage detection result. FIG. 6C shows an exemplary example of optimizing damage detection results, according to one embodiment of the invention. FIG. 6C shows that the right-most candidate damaged area 600 has been excluded from the damage detection result that was shown in FIG. 6B. Hence, the damage detection result has been optimized in FIG. 6C and an accuracy of damage detection process has also improved.

Exemplary Computer System and Apparatus

Figure 7:
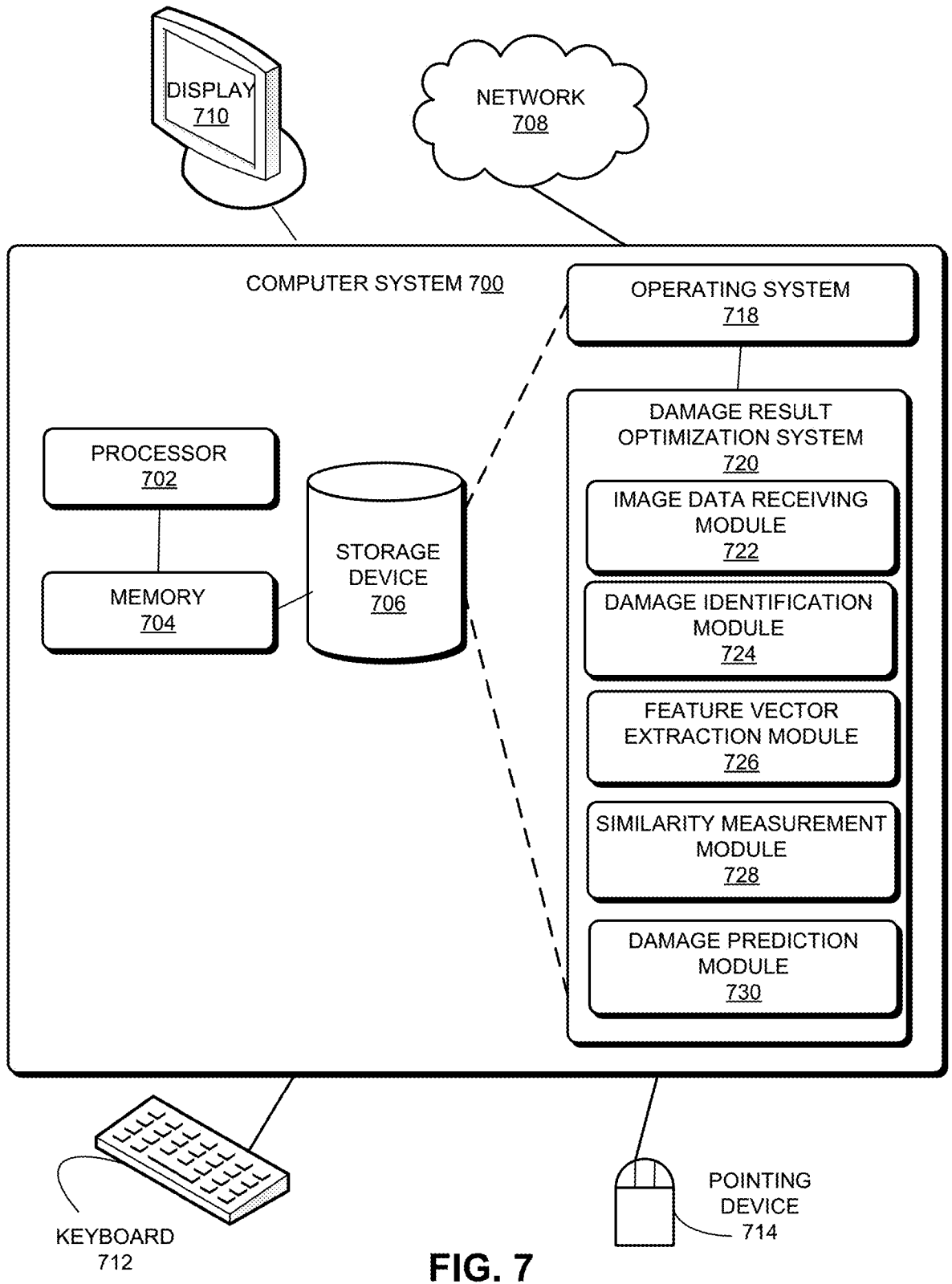
FIG. 7 illustrates an exemplary computer system that facilitates optimization of damage detection results, according to one embodiment of the present invention.

FIG. 7 illustrates an exemplary computer system that facilitates optimization of damage detection results, according to one embodiment of the present invention. Computer system 700 includes a processor 702, a memory 704, and a storage device 706. Computer system 700 can be coupled to a display device 710, a keyboard 712, and a pointing device 714, and can also be coupled via one or more network interfaces to network 708. Storage device 706 can store an operating system 718, and a damage result optimization system 720.

Damage result optimization system 720 can include instructions, which when executed by computer system 700 can cause computer system 700 to perform methods and/or processes described in this disclosure. Damage result optimization system 720 can also include instructions for receiving image data that includes digital images of a damaged vehicle (image data receiving module 722), instructions for identifying a plurality of candidate damaged areas as a damage detection result based on the digital images of the vehicle (damage identification module 724), and instructions for extracting feature vectors from the plurality of candidate damaged areas (feature vector extraction module 726). Furthermore, damage result optimization system 720 can include instructions for calculating similarity features between a first candidate damaged area and all other candidate damaged areas based on the extracted feature vectors (similarity measurement module 728), and instructions for predicting that the first candidate damaged area is an exceptional area (damage prediction module 730).

Figure 8:
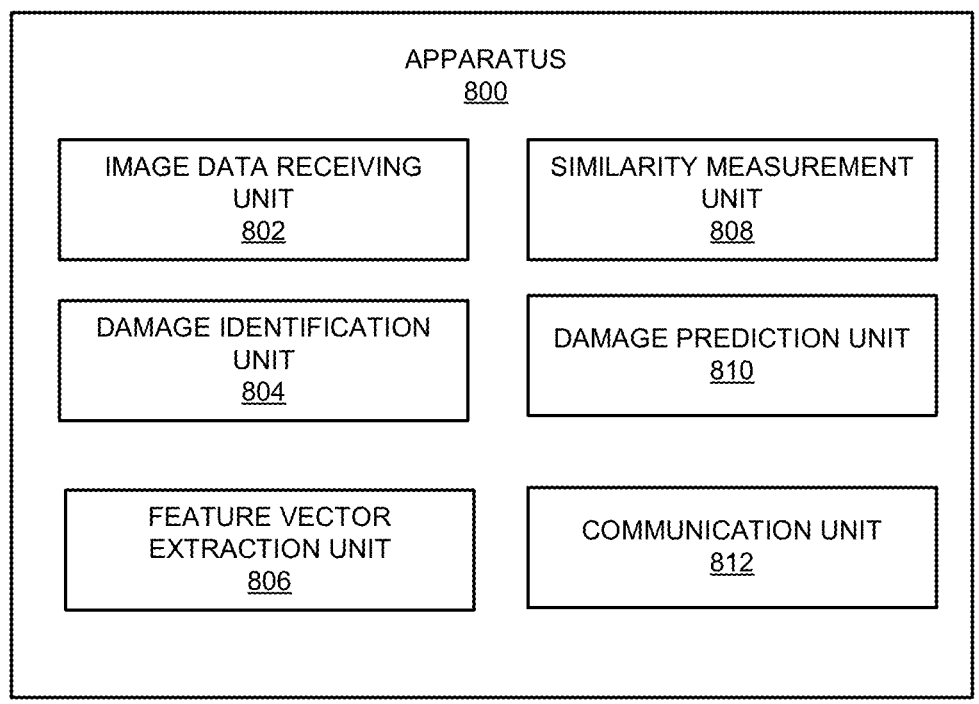
FIG. 8 illustrates an exemplary apparatus that facilitates optimization of damage detection results, according to one embodiment of the present invention.

FIG. 8 illustrates an exemplary apparatus that facilitates optimization of damage detection results, according to one embodiment of the present invention. Apparatus 800 can comprise a plurality of units or apparatuses that may communicate with one another via a wired, wireless, quantum light, or electrical communication channel. Apparatus 800 may be realized using one or more integrated circuits, and may include fewer or more units or apparatuses than those shown in FIG. 8. Further, apparatus 800 may be integrated in a computer system, or realized as a separate device that is capable of communicating with other computer systems and/or devices. Specifically, apparatus 800 can comprise units 802-810, which perform functions or operations similar to modules 722-730 of computer system 700 of FIG. 7, including: an image data receiving unit 802, a damage identification unit 804, a feature vector extraction unit 806, a similarity measurement unit 808, and a damage prediction unit 810. Apparatus 800 can further include a communication unit 812.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for optimizing a damage detection result, the method comprising:
   storing, by a server, a digital image of a target object, wherein the target object represents a damaged vehicle;
   applying, by the server, a damage identification model to identify a set of candidate damaged areas from the digital image as the damage detection result by:
   identifying a plurality of damage objects in the digital image; and
   marking each damage object in the plurality of damage objects by a bounding box, wherein the bounding box comprises the damage object, and wherein the damage object represents a candidate damaged area;
   extracting a set of feature vectors corresponding to the set of candidate damaged areas;
   for each candidate damaged area in the target object:
   calculating a set of similarity features between the candidate damaged area and other candidate damaged areas in the set of candidate damaged areas based on the set of feature vectors;
   applying, based on the set of similarity features, a damage prediction model including a neural network structure to determine whether the candidate damaged area is an exceptional damaged area based on a probability associated with the candidate damaged area and a predetermined threshold;
   in response to detecting that the candidate damaged area is an exceptional area, identifying the candidate damaged area as a non-real damaged area; and
   excluding the candidate damaged area from the damage detection result thereby facilitating optimization of the damage detection result.

2. The method of claim 1, wherein applying the damage identification model comprises:
   identifying a damage category for each damage object.

3. The method of claim 1, wherein extracting the set of feature vectors corresponding to the set of candidate damaged areas comprises:
   applying a convolution processing technique to the digital image to obtain a feature map of the digital image; and
   extracting, by using the feature map, the set of feature vectors corresponding to the set of candidate damaged areas.

4. The method of claim 1, further comprising:
   training the damage prediction model based on a training sample set,
   wherein the training sample set includes a set of positive samples and a set of negative samples;
   wherein the set of positive samples includes a plurality of real damaged areas; and
   wherein the set of negative samples includes a plurality of real damaged areas and at least one non-real damaged area.

5. The method of claim 1, further comprising:
   applying, based on the set of similarity features, the damage prediction model to output the probability associated with the candidate damaged area.

6. An apparatus for optimizing a damage detection result, comprising:
   one or more processors; and
   a storage medium storing instructions that, when executed by the one or more processors, cause the apparatus to perform a method comprising:
   storing a digital image of a target object, wherein the target object represents a damaged vehicle;
   applying a damage identification model to identify a set of candidate damaged areas from the digital image as the damage detection result by:
   identifying a plurality of damage objects in the digital image; and marking each damage object in the plurality of damage objects by a bounding box, wherein the bounding box comprises the damage object, and wherein the damage object represents a candidate damaged area;

extracting a set of feature vectors corresponding to the set of candidate damaged areas;

for each candidate damaged area in the target object:

calculating a set of similarity features between the candidate damaged area and other candidate damaged areas in the set of candidate damaged areas based on the set of feature vectors;

applying, based on the set of similarity features, a damage prediction model including a neural network structure to determine whether the candidate damaged area is an exceptional damaged area based on a probability associated with the candidate damaged area and a predetermined threshold;

in response to detecting that the candidate damaged area is an exceptional area, identifying the candidate damaged area as a non-real damaged area; and excluding the candidate damaged area from the damage detection result thereby facilitating optimization of the damage detection result.

7. The apparatus of claim 6, wherein applying the damage identification model further comprises:

identifying a damage category for each damage object.

8. The apparatus of claim 6, wherein extracting the set of feature vectors corresponding to the set of candidate damaged areas comprises:

applying a convolution processing technique to the digital image to obtain a feature map of the digital image; and extracting, by using the feature map, the set of feature vectors corresponding to the set of candidate damaged areas.

9. The apparatus of claim 6, wherein the method further comprising:

training the damage prediction model based on a training sample set, wherein the training sample set includes a set of positive samples and a set of negative samples;

wherein the set of positive samples includes a plurality of real damaged areas; and wherein the set of negative samples includes a plurality of real damaged areas and at least one non-real damaged area.

10. The apparatus of claim 6, wherein the method further comprising:

applying, based on the set of similarity features, the damage prediction model to output the probability associated with the candidate damaged area.

11. A non-transitory computer-readable storage medium storing instructions that when executed by a computer cause the computer to perform a method for optimizing a damage detection result, the method comprising:

storing, by a server, a digital image of a target object, wherein the target object represents a damaged vehicle;

applying, by the server, a damage identification model to identify a set of candidate damaged areas from the digital image as the damage detection result by:

identifying a plurality of damage objects in the digital image; and marking each damage object in the plurality of damage objects by a bounding box, wherein the bounding box comprises the damage object, and wherein the damage object represents a candidate damaged area;

extracting a set of feature vectors corresponding to the set of candidate damaged areas;

for each candidate damaged area in the target object:

calculating a set of similarity features between the candidate damaged area and other candidate damaged areas in the set of candidate damaged areas based on the set of feature vectors;

applying, based on the set of similarity features, a damage prediction model including a neural network structure to determine whether the candidate damaged area is an exceptional damaged area based on a probability associated with the candidate damaged area and a predetermined threshold;

in response to detecting that the candidate damaged area is an exceptional area, identifying the candidate damaged area as a non-real damaged area; and excluding the candidate damaged area from the damage detection result thereby facilitating optimization of the damage detection result.

12. The non-transitory computer-readable storage medium claim 11, wherein the method further comprising:

training the damage prediction model based on a training sample set, wherein the training sample set includes a set of positive samples and a set of negative samples;

wherein the set of positive samples includes a plurality of real damaged areas; and wherein the set of negative samples includes a plurality of real damaged areas and at least one non-real damaged area.

13. The non-transitory computer-readable storage medium claim 11, wherein the method further comprising:

applying, based on the set of similarity features, the damage prediction model to output the probability associated with the candidate damaged area.

* * * * *